Oct. 14, 1952 P. MOLL 2,614,221

FREQUENCY CONTROL DEVICE

Filed Feb. 26, 1948

INVENTOR
Pierre Moll
By. [signature]
HIS AGENT.

Patented Oct. 14, 1952 2,614,221

UNITED STATES PATENT OFFICE 2,614,221

FREQUENCY CONTROL DEVICE

Pierre Moll, Paris, France

Application February 26, 1948, Serial No. 11,288
In France March 7, 1947

7 Claims. (Cl. 250—36)

Figure 1:
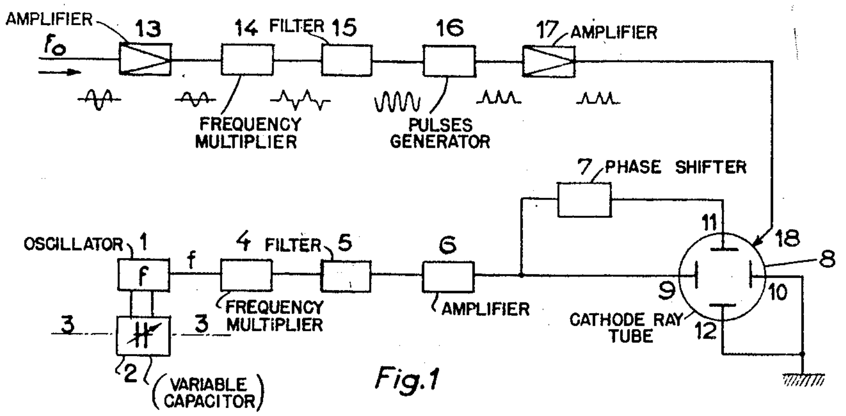

The present invention relates to a new device for controlling the frequency of an oscillator of controllable frequency by comparison with a standard frequency.

Various methods are known for measuring the drift of an oscillator by comparing the frequency F generated by the latter with a standard reference frequency $F_0$.

One of these methods consists in using a cathode ray tube ossillograph having two pairs of deflecting plates wherein one of the pairs of plates is supplied with the reference frequency $F_0$, and the other pair of plates is supplied with the same frequency $F_0$, previously displaced in phase by 90°, which makes it possible to obtain a luminous circle on the oscillograph screen. In this case, the electrode controlling the intensity of the electron beam current of the tube is negatively biased so as to suppress said beam for most of the time and is submitted to very short positive pulses at the frequency F to be measured. A luminous spot is thus obtained on the fluorescent screen of the oscillograph which rotates in one or the other direction at an angular frequency proportional to the difference $F_0-F$ of the two frequencies. On another hand, when it is desired to adjust automatically the frequency of an oscillator to make it equal to the standard frequency, a variable capacitor connected to the terminals of a circuit of the oscillator is generally acted upon, by means of a rotating field motor supplied with a current having a frequency equal to:

$$\Delta F = F_0 - F$$

derived from some device supplied with the frequency F to be controlled and the standard frequency $F_0$.

In accordance with the present invention, there are added to a cathode ray tube of the above mentioned type elements enabling the said tube to control a variable capacitor or a set of fixed capacitors, for automatically adjusting the frequency of the oscillator in successive steps, and thus making it as close as desired to the standard frequency, while leaving the frequency at its last adjusted value in case the standard frequency momentarily disappears.

To this effect, the cathode ray tube is provided with three conducting targets of circular sector shape set up in a plane substantially perpendicular to the undeflected direction of the electron beam and in such a manner around the impact point of the said beam upon said plane that the said beam successively falls upon each of them while describing its circular path. Further, these targets are separated by gaps and mutually spaced by an angle $\alpha_0$ when seen from said impact point.

The current impulses of frequency F received successively by these three targets are used for controlling, through three electronic amplifiers a system of relays causing a step by step variation, in one or the other direction either of an adjustable capacitor or of a switch equipped with fixed capacitors, said capacitor or capacitors being connected in the oscillator circuit to be controlled.

The purpose of these amplifiers is to cause the operation of the relay system, in one or the other direction, as soon as the speed of rotation of the electron beam becomes equal to or larger than, in one or the other direction, to a given angular speed, i. e. as soon as the difference between the frequency to be measured F and the standard frequency $F_0$ becomes equal to or larger than $\pm\Delta F_0$.

The amplifier connected to the central target sensitizes the two amplifiers connected to the two other targets during a time interval $$t_0 = \frac{1}{\Delta F_0} \frac{\alpha_0}{360}$$

which corresponds to the time taken by the beam for covering the angle $\alpha_0$ measured in degrees separating the targets when the frequency deviation reaches the maximum value $\Delta F_0$. As soon as the frequency deviation $\Delta F$ reaches or exceeds $\Delta F_0$, one of the two amplifiers, depending on the direction of rotation of the electron beam, receives current impulses while still sensitized and thus controls the relay system which immediately corrects the frequency of the oscillator to be controlled and, consequently stops the beam or, at least, gives it an angular velocity much lower than the limiting operation velocity of the system.

This method can be used not only in case the standard frequency is equal to the frequency of the oscillator to be controlled, but also in all cases where the ratio of the two frequencies is equal to $$\frac{k}{k}$$

($k$ and $k'$ being integers). It then becomes necessary to use no longer the two frequencies directly for controlling the cathode ray tube but suitable harmonics of one or both frequencies in such a manner that two new frequencies are obtained which are equal if the drift of the oscillator is zero.

If it is desired to increase the sensitivity of the system, it is always possible to multiply the two new frequencies thus obtained by the same integer $n$, before applying them to the cathode ray tube. There is thus obtained for a given maximum deviation $\pm\Delta F_0$, between the two frequencies which are effectively applied to the cathode ray tube, a maximum relative deviation $\Delta f/f$ $n$ times smaller for the oscillator's own frequency, or, a total $$\frac{\Delta f}{f} \leq \frac{\Delta f_0}{nkf}$$

where $f$ is the frequency of the oscillator to be controlled and to be corrected, and $f_0$ is the standard frequency; these frequencies being in the rational ratio $$\frac{f}{f_0} = \frac{k'}{k}$$

harmonics of orders $k$ and $k'$ will have to be used, such that $$kf = k'f_0$$

or $$nkf = k'f_0$$

The appended drawing, given by way of non-limitative example and the description relative thereto will make the operation of the system clearer.

Figure 1 shows the control device for the cathode ray tube oscillograph. The frequency $f$ of oscillator 1, whose drift is to be corrected by means of the standard frequency $f_0$ is adjusted by means of a variable capacitor adjustably rotatable about an axis represented by the broken line 3—3 of Figs. 1 and 2.

The frequency $f$ is multiplied by a coefficient $k$ in a frequency multiplier 4, filtered at 5, amplified at 6 and applied, on one side directly to one pair of deflecting plates 9 and 10 of the cathode ray tube 8 and, on the other side, through a phase shifter 7 to a second pair of deflecting plates 11 and 12 of the same tube 8. It is assumed that the two pairs of deflecting plates are mutually perpendicular.

The pilot or reference frequency $f_0$, is amplified at 13, multiplied by a coefficient $k'$ in a frequency multiplier 14, filtered at 15 and applied to a generator 16 producing short pulses of same frequency $f_0$. These pulses are amplified at 17 and applied to a beam intensity control electrode 18 of the tube 8.

Of course the equation $$kf = k'f_0$$

must be satisfied.

The electron beam is thus caused to rotate at a velocity $N = \Delta F = (k'f_0 - kf)$ turns per second, in one or the other direction according to whether the frequency $kf$ is lower or higher than $k'f_0$.

Figures 2, 3, 4:
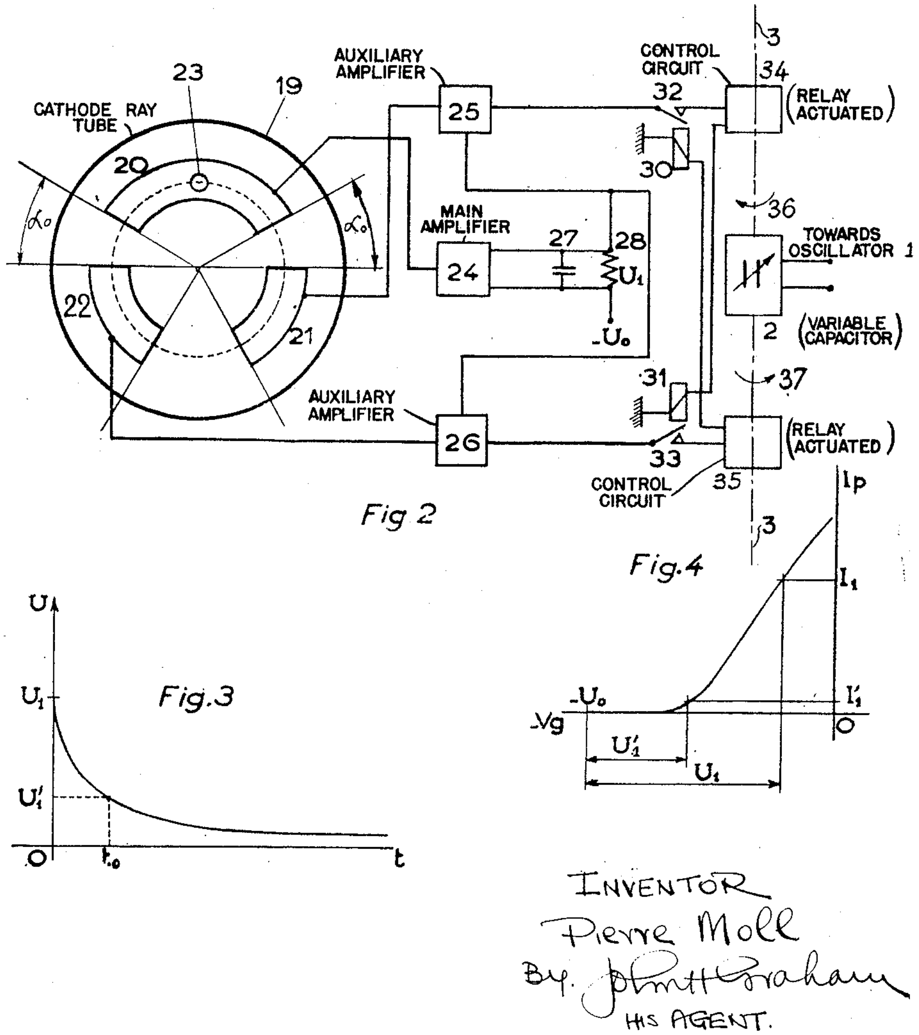

Figure 2 shows the cathode ray tube 19, corresponding to the tube 8 of Fig. 1, and having the three targets 20—21—22 in the shape of circular sectors separated by angles $\alpha_0$.

The beam 23 successively falls upon each of them while moving in a circle.

The main amplifier 24 generates at its output a voltage $U_1$ at the terminals of resistor 28 shunted by capacitor 27, during the whole time the target 20 is scanned by ray 23.

This voltage decreases in accordance with an exponential law, as a function of time, due to the discharge of capacitor 27 through resistor 28 as soon as the beam 23 leaves target 20. The voltage $U_1$ decreases and, after a time $t_0$ reaches the value $U'_1$ as shown in Figure 3.

The two auxiliary amplifiers 25 and 26 comprise tubes whose control grids are normally biassed to a high negative voltage $U_0$, so that their anode current is cut-off and does not supply any voltage to their output terminals.

The anode current versus grid voltage characteristics of these tubes are shown in Fig. 4.

These amplifiers are "blocked," i. e. rendered inoperative as soon as the bias voltage applied to their grids is equal to or larger than $U'_1$.

As soon as amplifier 24 operates, it unblocks the two amplifiers 25 and 26 during the whole time the electron beam sweeps over target 20, which allows the charging of capacitor 27, the unblocking persisting for a certain time $t_0$ during which the ray continues its circular motion outside target 20.

If the beam reaches one of the targets 21 or 22, (depending on the direction of rotation) after a time shorter than $t_0$, the corresponding amplifier 25 or 26 sends a current larger than $I'_1$ (Figure 4) to a relay actuated control circuit 34 or 35, which, by means of conventional structure, such as, a ratchet drive (not shown), causes the variable capacitor 29, corresponding to the variable capacitor 2 of Fig. 1, or any other similar element to rotate in a step-by-step manner through a predetermined angle about the axis 3 in one or the other direction (36 or 37), thus causing a frequency variation $\Delta F_0$ in a direction opposite to that which caused the rotation of the beam.

It is then assumed that the condition of the relays 30 and 31 is such that contacts 32 and 33 be closed.

An automatic regulation is thus obtained of the frequency of oscillator I in successive steps, each time its frequency varies by an amount $$\frac{\Delta F}{k}$$

equal to or larger than $$\frac{\Delta F_0}{k}$$

If the beam happens to rotate suddenly at a velocity much higher than $\Delta F_0$ turns per second, the two amplifiers 25 and 26 might happen to be sensitized at the same time, which would cause a cancellation of the control of capacitor 29.

To avoid this, the circuits 34 and 35 block each other by means of the relays 30 and 31 and their contacts 32 and 33.

The targets and the angle $\alpha_0$ should be dimensioned according to the operating time constants of the amplifiers.

Further, a signalling system can readily be provided by means of circuits 34 and 35.

When the drift of the oscillator is small, the beam rotates slowly and the amplifiers 25 and 26 cannot act, being blocked before the beam reaches their respective targets. As soon as the velocity of the beam is sufficient and as soon as it has gone through the angle $\alpha_0$ separating target 20 from each of the two targets 21 and 22, the system operates. The operation delay, therefore, is low and in any case, lower than the time necessary for the beam to effect a complete turn, the latter being a limiting case.

When the frequency of oscillator I varies suddenly by a quantity $\Delta F$ equal to $$p\frac{\Delta F_0}{k}$$

the control circuits operates at each revolution of the beam, very rapidly at first, then more and more slowly as $\Delta F$ decreases. The maximum time T necessary for correction is then equal to:

$$T<t_1+t_2+\ldots t_n=\frac{1}{p\Delta F_0}+\frac{1}{(p-1)\Delta F_0}+\ldots+\frac{1}{\Delta F_0}$$

Finally in case the standard frequency happens to fail, the cathode ray beam disappears and the oscillator remains at a frequency $f'$ such that $$\frac{1}{k}(k'f_0-\Delta F_0)\leq f'\leq\frac{1}{k}(k'f_0+\Delta F_0)$$

i. e. within the predetermined limits.

What I claim is:

1. A radiant energy device for controlling the frequency of an oscillator comprising an oscillator having an output frequency to be controlled, including a frequency adjusting element, a cathode ray device having at least a grid, two pairs of ray deflecting plates and a target electrode, means for supplying to one pair of said deflecting plates said output frequency and a component thereof differing in phase by 90° to the other pair of plates, means for generating pulses at a pilot frequency connected to supply said grid for controlling the beam of the tube, a main and two subsidiary elements disposed in the path of the cathode ray forming said target electrode, said subsidiary elements being separated from one another and in symmetrical relation with respect to said main element, means for translating signal voltages of the respective elements of said target, means for deriving a controlling bias voltage from the translating means of said main element in accordance with the position of the cathode ray beam thereon, means for applying said bias voltage to the translating means of said subsidiary elements for control thereof, and means connected to the respective translating means of said subsidiary elements for controlling the actuation of said frequency adjusting element in one and the other sense operatively connected to said adjusting element.

2. A device according to claim 1, wherein said actuation controlling means comprises a stepping relay switch for each of said subsidiary elements, further including a locking relay switch for each said stepping switch connected to be energized from the respective other stepping switch.

3. A device according to claim 2, wherein said frequency adjusting means comprises a variable capacitor in the circuit of said oscillator, said stepping switches serving to effect a rotary adjustment of said adjusting element.

4. A device for automatically synchronizing the frequency of an oscillator of controllable frequency with a standard frequency, comprising a cathode-ray tube including a cathode for emitting electrons, means for forming an electron beam, a control electrode for influencing intensity of said beam, two pairs of deflecting plates for respectively deflecting said beam into a first and a second direction substantially perpendicular to each other, a main conducting target and two auxiliary conducting targets, each of said targets having a circular sector shape, being set up in a plane substantially perpendicular to direction of undeflected path of said beam, and around the point of impact of said undeflected beam upon said plane, and being separated by gaps and electrically insulated from the others, means for deriving from said oscillator of controllable frequency two voltages shifted in phase relatively to each other by 90 degrees, means for respectively impressing each of said voltages upon one of said pairs of deflecting plates, means for impressing voltage pulses of standard frequency upon above-said control electrode, a main amplifier connected to said main target, two auxiliary amplifiers respectively connected to each one of said auxiliary targets, means controlled by output of said main amplifiers and adapted to block and release the amplifier connected to either of said auxiliary targets according to the electric state of said main target and means for controlling frequency of above-said oscillator of controllable frequency under control of both of said auxiliary amplifiers.

5. A device as claimed in claim 4, wherein the output of said main amplifier feeds a resistor shunted by a capacitor and in series with a direct current biasing voltage source, means connecting the assembly of said shunted resistor and biasing voltage source to each of said auxiliary amplifiers and adapted to block and release said amplifiers according to the current flowing through said resistor.

6. A device as claimed in claim 5, further comprising two relays respectively fed from output of each of said auxiliary amplifiers and adapted to actuate contacts inserted in a control circuit controlling frequency of said oscillator of controllable frequency.

7. A device as claimed in claim 6, wherein said control circuit includes an adjustable condenser the capacity of which is respectively varied in opposite directions by contacts respectively actuated by each of said relays.

PIERRE MOLL.

REFERENCES CITED

The following references are of record in the file of this patent:

UNITED STATES PATENTS

| Number | Name | Date |
|---|---|---|
| 2,344,679 | Crosby | Mar. 21, 1944 |